United States Patent
Wu et al.

(10) Patent No.: US 9,198,195 B2
(45) Date of Patent: Nov. 24, 2015

(54) METHOD AND APPARATUS FOR IMPROVING COEXISTENCE OF SYNCHRONOUS AND ASYNCHRONOUS NODES IN A SYNCHRONOUS MAC SYSTEM

(75) Inventors: Xinzhou Wu, Monmouth Junction, NJ (US); Sundar Subramanian, Somerville, NJ (US); Shihuan Liu, Ames, IA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 13/566,660

(22) Filed: Aug. 3, 2012

(65) Prior Publication Data

US 2013/0195082 A1 Aug. 1, 2013

Related U.S. Application Data

(60) Provisional application No. 61/515,557, filed on Aug. 5, 2011.

(51) Int. Cl.
*H04W 74/08* (2009.01)

(52) U.S. Cl.
CPC ................. *H04W 74/0808* (2013.01)

(58) Field of Classification Search
CPC . H04W 84/12; H04W 28/22; H04W 74/0816; H04W 28/04; H04W 74/08
See application file for complete search history.

(56) References Cited

U.S. PATENT DOCUMENTS

| 2002/0163933 A1* | 11/2002 | Benveniste ................ 370/465 |
| 2005/0058151 A1 | 3/2005 | Yeh |
| 2005/0135318 A1 | 6/2005 | Walton et al. |
| 2005/0165950 A1 | 7/2005 | Takagi et al. |
| 2005/0220145 A1* | 10/2005 | Nishibayashi et al. ...... 370/474 |
| 2005/0276276 A1* | 12/2005 | Davis ........................ 370/447 |
| 2007/0116035 A1 | 5/2007 | Shao et al. |
| 2007/0133448 A1* | 6/2007 | Gao et al. .................. 370/311 |
| 2009/0252053 A1* | 10/2009 | Leith et al. ................. 370/252 |

FOREIGN PATENT DOCUMENTS

| JP | 2000236338 A | 8/2000 |
| JP | 2006222608 A | 8/2006 |
| JP | 2009141405 A | 6/2009 |

(Continued)

OTHER PUBLICATIONS

International Search Report and Written Opinion—PCT/US2012/049795—ISA/EPO—Nov. 26, 2012.

*Primary Examiner* — Jung Park
(74) *Attorney, Agent, or Firm* — Joseph Hanasz

(57) ABSTRACT

A method, an apparatus, and a computer program product for wireless communication are provided. The apparatus may be configured to determine a plurality of slots for transmitting information including a plurality of first type slots and a plurality of second type slots where the second type slots have a longer duration that the first type slots. The apparatus may be configured to transmit information in a first type slot when a previous reception was successful and there is no other transmission expected to occur during a gap preceding the first type slot and during the first type slot. Additionally or in the alternative, apparatus may be configured to transmit information in a second type slot when at least one of the previous reception was unsuccessful or there is another transmission expected to occur during a gap preceding the first type slot or during the first type slot.

48 Claims, 9 Drawing Sheets

(56) References Cited

FOREIGN PATENT DOCUMENTS

| | | | |
|---|---|---|---|
| JP | 2010213149 A | 9/2010 | |
| JP | 2010220226 A | 9/2010 | |
| WO | WO03026221 A1 | 3/2003 | |
| WO | 2006132506 A1 | 12/2006 | |

* cited by examiner

METHOD AND APPARATUS FOR IMPROVING COEXISTENCE OF SYNCHRONOUS AND ASYNCHRONOUS NODES IN A SYNCHRONOUS MAC SYSTEM

CLAIM OF PRIORITY UNDER 35 U.S.C. §119

This application claims the benefit of U.S. Provisional Application Ser. No. 61/515,557, entitled "METHOD AND APPARATUS FOR IMPROVING COEXISTENCE OF SYNCHRONOUS AND ASYNCHRONOUS NODES IN A SYNCHRONOUS MAC SYSTEM" and filed on Aug. 5, 2011, which is expressly incorporated by reference herein in its entirety.

BACKGROUND

1. Field

The present disclosure relates generally to communication systems, and more particularly, to improving coexistence of synchronous and asynchronous nodes in a synchronous MAC system.

2. Background

In various communications systems, carrier sensing alone or in combination with a randomized backoff transmission time technique is used to determine when a device will transmit on a physical communications channel. In a typical 802.11 based system, a broadcast packet is transmitted on a channel based on a distributed coordination function (DCF) mechanism. The system may include multiple nodes.

For broadcasting messages, 802.11 CSMA based media access control (MAC) lead to poor performance at high node density, due in part to packet reception collisions. Where a synchronous MAC is introduced, nodes with access to GPS or other timing signals may only attempt to transmit at a given slot boundary. The said slot is further selected from a plurality of possible slots based on the interference measured at each slot (e.g. a node may pick a slot with the least amount of interference). This kind of simple synchronous MAC allows for maximizing geometrical separation between nodes transmitting at the same slot and thus improves the overall system performance.

However, if only a fraction of the nodes are enabled with this synchronous MAC slot timing scheme, the performance of the overall system deteriorates as the number of legacy nodes increases. This is because a node that starts transmitting in the middle of a slot can cause a snow-ball effect to the other nodes which eventually may destroy the structure formed in the synchronous MAC.

Therefore, there is a need in the art for improving the performance of the synchronous MAC in the presence of legacy nodes while minimizing an overall performance reduction to a synchronous MAC system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects are described in connection with improving coexistence of synchronous and asynchronous nodes in a synchronous MAC system. In one example, a apparatus may be configured to determine a plurality of slots for transmitting information including a plurality of first type slots and a plurality of second type slots where the second type slots have a longer duration that the first type slots. The apparatus may be configured to transmit information in a first type slot when a previous reception was successful and there is no other transmission expected to occur during a gap preceding the first type slot and during the first type slot. Additionally or in the alternative, apparatus may be configured to transmit information in a second type slot when at least one of the previous reception was unsuccessful or there is another transmission expected to occur during a gap preceding the first type slot or during the first type slot.

According to related aspects, a method for improving coexistence of synchronous and asynchronous nodes in a synchronous MAC system is described. The method can include determining a plurality of slots for transmitting information, the plurality of slots comprising a plurality of first type slots and a plurality of second type slots, the second type slots having a longer duration that the first type slots. The method can also include transmitting information in a first type slot of the plurality of first type slots when a previous reception was successful and there is no other transmission expected to occur during a gap preceding the first type slot and during the first type slot. Additionally or in the alternative, the method may include Another aspect relates to a communications apparatus. The communications apparatus can include means for determining a plurality of slots for transmitting information, the plurality of slots comprising a plurality of first type slots and a plurality of second type slots, the second type slots having a longer duration that the first type slots. Further, the communications apparatus can include means for transmitting information in a first type slot of the plurality of first type slots when a previous reception was successful and there is no other transmission expected to occur during a gap preceding the first type slot and during the first type slot. Additionally or in the alternative, the communications apparatus can include means for transmitting information in a second type slot of the plurality of second type slots when at least one of the previous reception was unsuccessful or there is another transmission expected to occur during a gap preceding the first type slot or during the first type slot.

Another aspect relates to a communications apparatus. The apparatus can include a processing system configured to determine a plurality of slots for transmitting information, the plurality of slots comprising a plurality of first type slots and a plurality of second type slots, the second type slots having a longer duration that the first type slots. The processing system may be further configured to transmit information in a first type slot of the plurality of first type slots when a previous reception was successful and there is no other transmission expected to occur during a gap preceding the first type slot and during the first type slot. Additionally or in the alternative, the processing system may be configured to transmit information in a second type slot of the plurality of second type slots when at least one of the previous reception was unsuccessful or there is another transmission expected to occur during a gap preceding the first type slot or during the first type slot.

Another aspect relates to a computer program product. The computer program product may include computer readable medium include code for determining a plurality of slots for transmitting information, the plurality of slots comprising a plurality of first type slots and a plurality of second type slots, the second type slots having a longer duration that the first type slots. Further, the computer program product may include computer readable medium include code for transmitting information in a first type slot of the plurality of first type slots when a previous reception was successful and there is no other transmission expected to occur during a gap preceding the first type slot and during the first type slot. Additionally or in the alternative, the computer program product may include computer readable medium include code for transmitting information in a second type slot of the plurality of second type slots when at least one of the previous reception was unsuccessful or there is another transmission expected to occur during a gap preceding the first type slot or during the first type slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
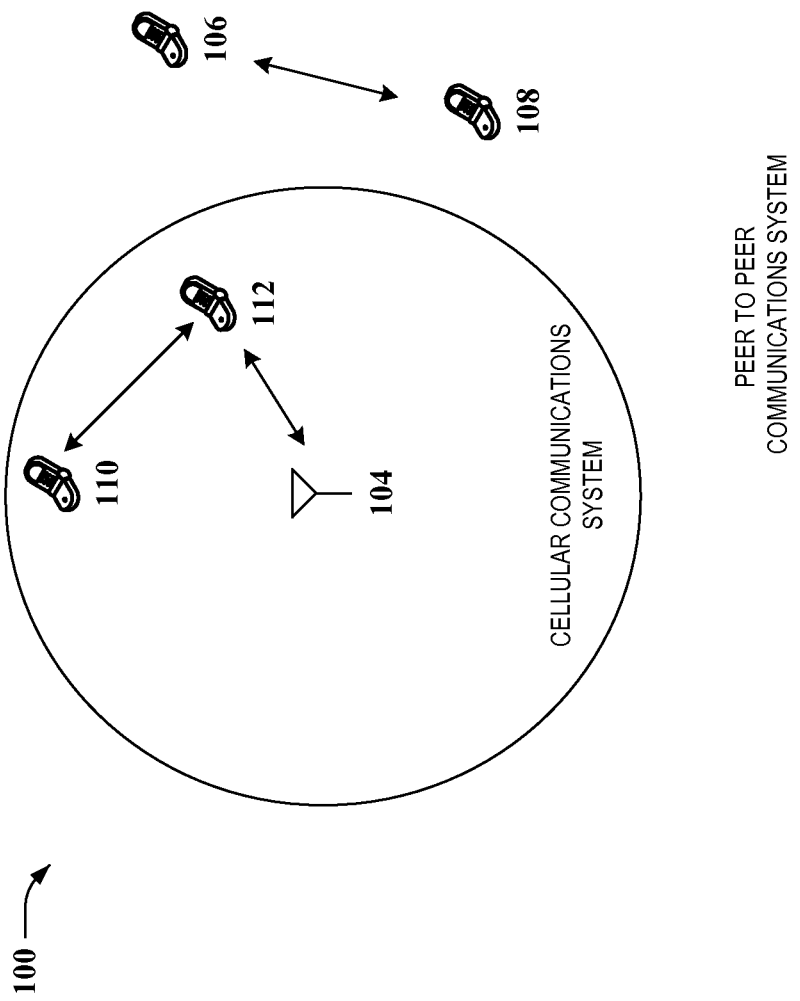
FIG. 1 is a drawing of a wireless peer-to-peer communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a drawing of an exemplary peer-to-peer communications system 100. The peer-to-peer communications system 100 includes a plurality of wireless devices 106, 108, 110, 112. The peer-to-peer communications system 100 may overlap with a cellular communications system, such as for example, a wireless wide area network (WWAN). Some of the wireless devices 106, 108, 110, 112 may communicate together in peer-to-peer communication, some may communicate with the base station 104, and some may do both. For example, as shown in FIG. 1, the wireless devices 106, 108 are in peer-to-peer communication and the wireless devices 110, 112 are in peer-to-peer communication. The wireless device 112 is also communicating with the base station 104.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 2:
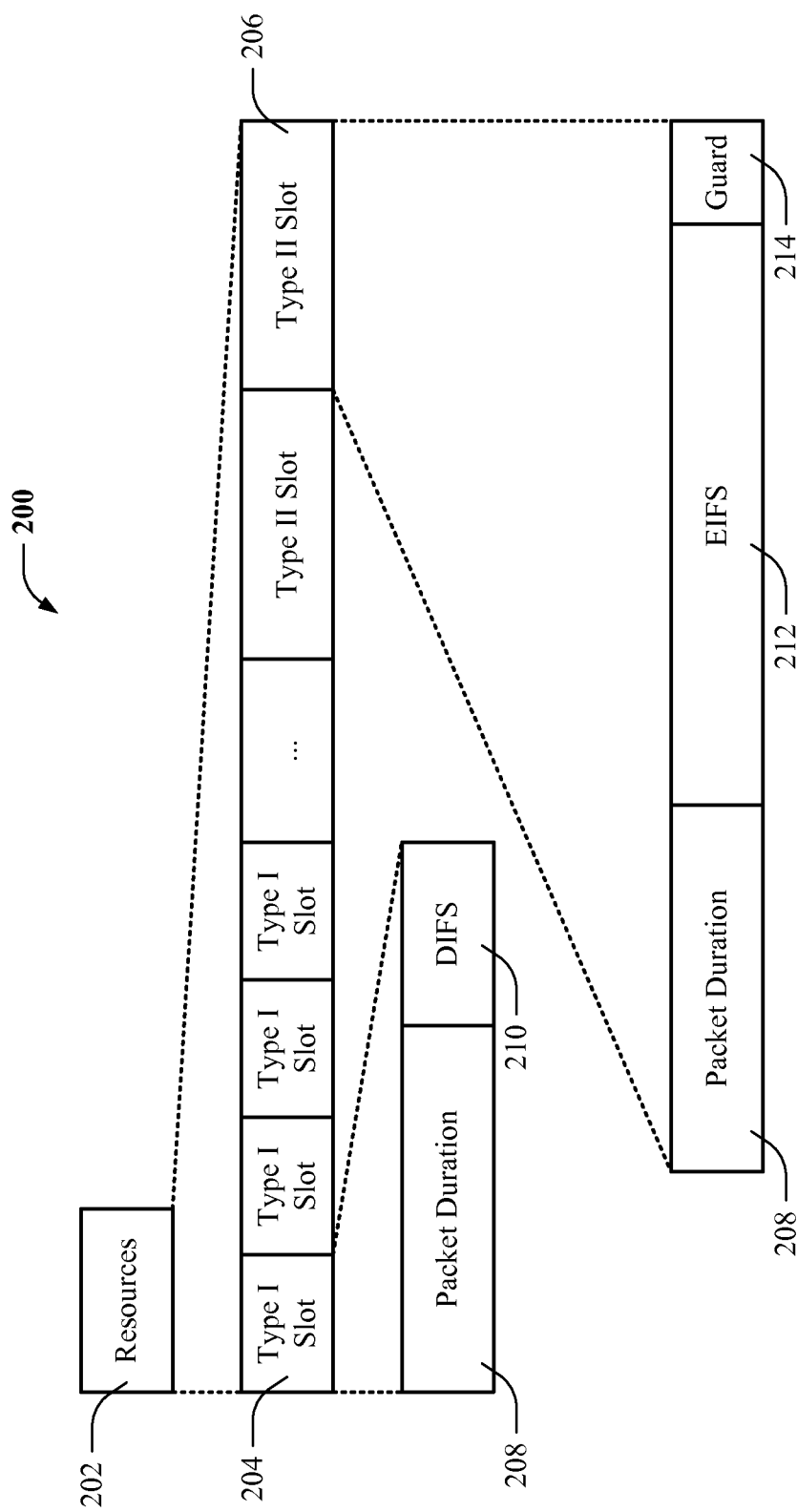
FIG. 2 is a diagram illustrating an exemplary time structure for peer-to-peer communication between the wireless devices.

FIG. 2 is a diagram 200 illustrating an exemplary time structure for peer-to-peer communication between the wireless devices 100. In one aspect, the peer-to-peer communications are enabled within a 802.11 CSMA based network. As depicted in FIG. 2, a hierarchical synchronous periodic channel structure may be overlaid on a MAC based timeline. The resources 202 are divided into multiple types sub-resources (for example, this could be a sequence of time-slots or combination of time-slot/frequency band combinations) and each device may choose a preferred sub-resource in which to contend for the channel. In one aspect, the sub-resources are divided into type I slots 204 and type II slots 206.

In one aspect, a type I slot 204 is equal to a packet duration 208 (e.g., a data transmission length) plus distributed coordination function (DCF) interframe space (DIFS) 210. In one aspect, a type II slot 206 is equal to a packet duration 208 (e.g., data transmission length) plus an extended interframe space (EIFS) 212 plus a guard 214 (e.g., a small overhead duration). As depicted in FIG. 2, a fraction (e.g. ½), of the time slots may be allocated for type-I slots 204 while the remainder of the time slots may be allocated for type II slot 206. Further, the type-I slots 204 are consecutive in time. In operation, as discussed further with reference to FIGS. 3 and 4, for synchronous MAC enabled nodes with successful last reception, the node may attempt to transmit during a selected type-I slot 204. By contrast, synchronous MAC enabled nodes that experienced an unsuccessful last reception and asynchronous MAC nodes may more likely than not attempt to transmit in the type-II slots 206. Due at least in part to the consecutive timing and time interval duration of the type I slots legacy nodes (e.g., asynchronous MAC nodes) are unlikely to transmit in the type-I slots 204. For a node to transmit, the node first senses at least a consecutive DIFS. As such, the packing and interval length definition of the type I slots 204 creates a high probability that any arrival of legacy nodes within the type-I slots will be deferred for transmission after type-I slots are complete.

Figure 3:
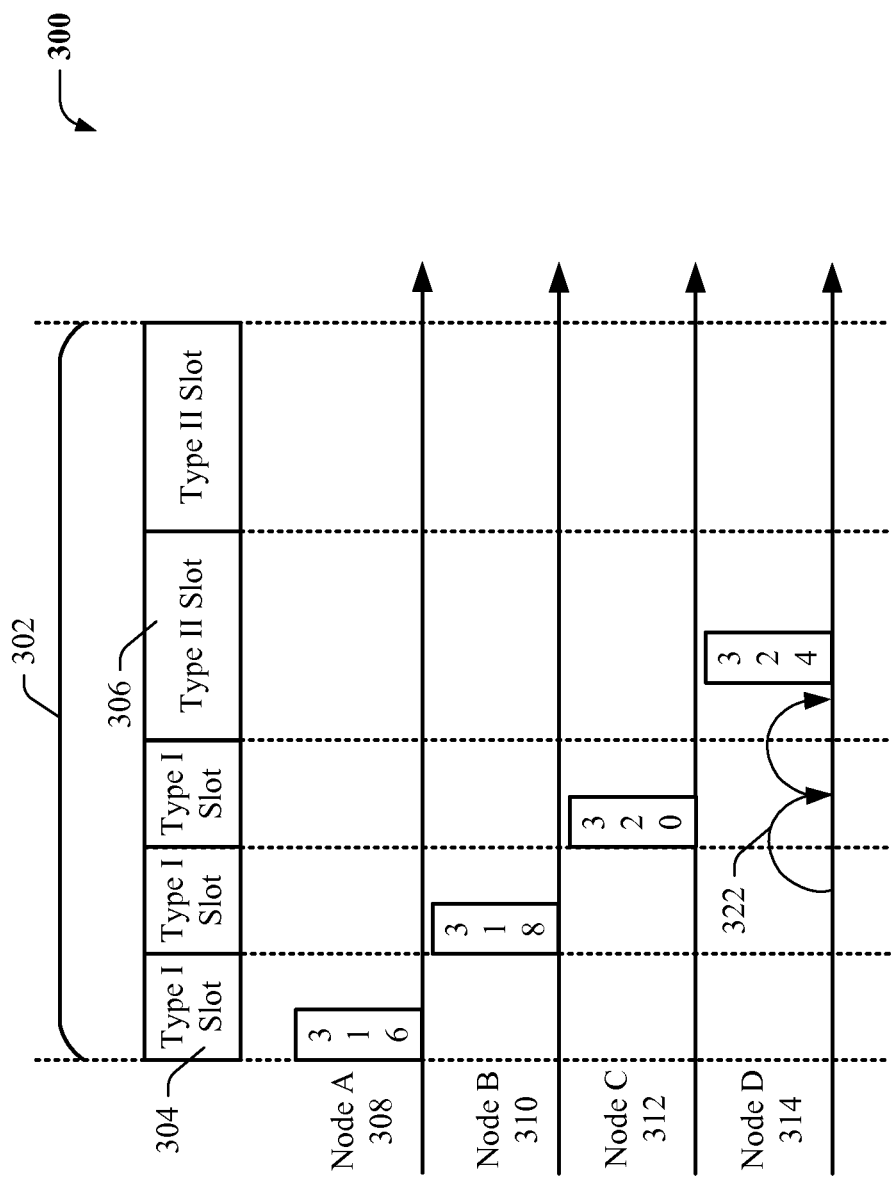
FIG. 3 is a diagram illustrating an operation timeline for structuring communication timing for multiple wireless devices in a peer-to-peer communications system, according to an aspect.

FIG. 3 is a diagram illustrating an operation timeline for structuring communication timing for multiple wireless devices in a peer-to-peer communications system 300 according to an aspect. As discussed with reference to FIG. 3, a resource 302 may be sub-divided into type I slots 304 and type II slots 306. In the system depicted in FIG. 3, nodes A, B, C, and D (308, 310, 312, 314) are attempting to communicate in system 300. Nodes A, B, and C (308, 310, and 312) are synchronous MAC enabled nodes, while node D 314 is a legacy node (e.g., asynchronous MAC enabled node). In the depicted operational aspect, node A 308 selects a first of the type I slots 304 within which to communicate information 316, node B 310 selects a second of the type I slots 304 within which to communication information 318, and node C 312 selects a third of the type I slots 304 within which to communicate information 320. Node D 314 (a legacy node) detects whether a transmission is possible 322 and determines the channel is busy. Thereafter, node D 314 attempts again after a defined duration. The second attempt by Node D 314 to communicate falls within the type II slots, and node D 314 is able to communicate information 324 during the type II slot.

At a subsequent repeating interval 303, because nodes A, B, and C (308, 310, 312) had previously detected successful receipt of the information (316, 318, 320) nodes A, B, and C (308, 310, 312) communicate using type I slots 304. Node D is a legacy node and does not have any knowledge of the synchronous MAC slot structure, and as such, communications performed by node D 314 are performed using 802.11 MAC CSMA protocols.

Figure 4:
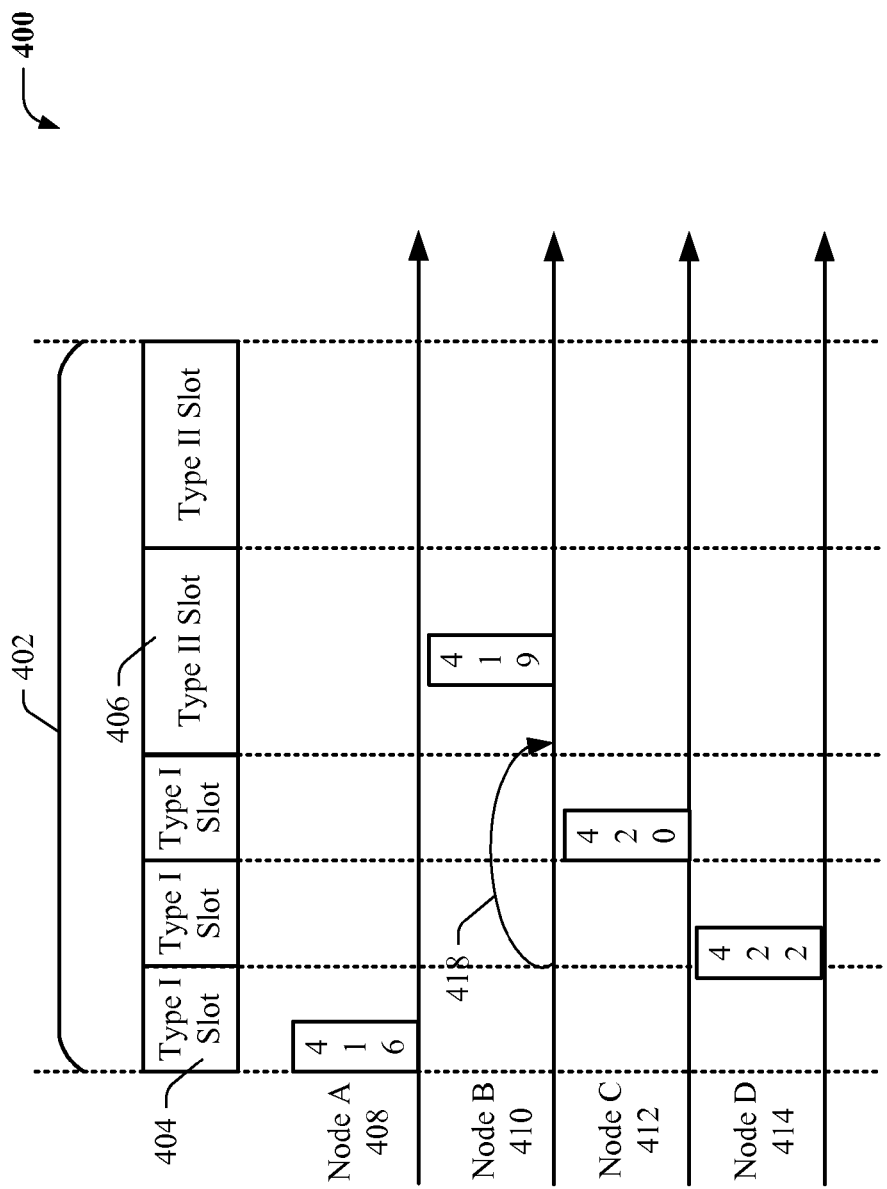
FIG. 4 is a diagram illustrating another operation timeline for structuring communication timing for multiple wireless devices in a peer-to-peer communications system, according to another aspect.

FIG. 4 is a diagram illustrating an operation timeline for structuring communication timing for multiple wireless devices in a peer-to-peer communications system 400 according to an aspect. As discussed with reference to FIG. 3, a resource 402 may be sub-divided into type I slots 404 and type II slots 406. In the system depicted in FIG. 4, nodes A, B, C, and D (408, 410, 412, 414) are attempting to communicate in system 400. Nodes A, B, and C (408, 410, and 412) are synchronous MAC enabled nodes, while node D 414 is a legacy node (e.g., asynchronous MAC enabled node). In the depicted operational aspect, node A 408 selects a first of the type I slots 404 within which to communicate information 416, node B 410 selects a second of the type I slots 404 within which to communication information 419, and node C 412 selects a third of the type I slots 404 within which to communication information 420. Node D 414 (a legacy node) detects whether a transmission is possible 422 and determines the channel is available. Thereafter, Node B 410 determines if the channel is available 418 and detects that another transmission has occurred within a gap preceding the type I slot Node B 410 has selected for transmission. In the depicted aspect, the transmission 422 is detected to have broken the boundary defining the type I slot Node B 410 has selected. Node B 410 determines that the selected type I slot is not available for transmission and instead attempts to transmit the information 419 during the time interval allocated for type II slots 406. By contrast, Node C 412 detects the previously successful transmission (e.g., the information 422 transmitted by Node D 414) during the type I slot preceding the type I slot selected by Node C 412, and as such, Node C 412 transmits information 420 during the type I slot selected by Node C 412. During a subsequent transmission interval, node B 410 may return to use of type I slots when it determines a successful transmission has occurs during the type I slot prior to the type I slot selected for its own transmissions.

Figure 5:
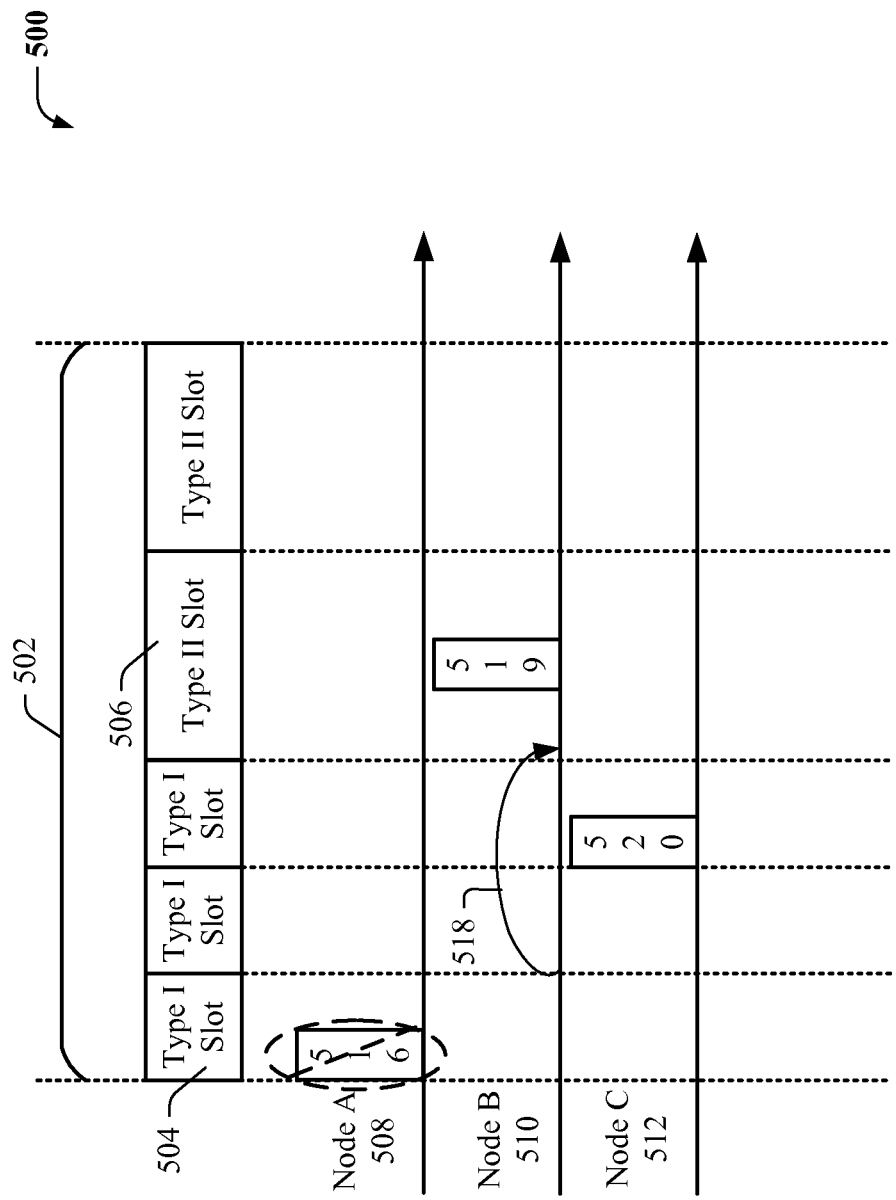
FIG. 5 is a diagram illustrating another operation timeline for structuring communication timing for multiple wireless devices in a peer-to-peer communications system according to still another aspect.

FIG. 5 is a diagram illustrating an operation timeline for structuring communication timing for multiple wireless devices in a peer-to-peer communications system 500 according to another aspect. As discussed with reference to FIG. 3, a resource 502 may be sub-divided into type I slots 504 and type II slots 506. In the system depicted in FIG. 5, nodes A, B, and C (508, 510, and 512) are attempting to communicate in system 500. Nodes A, B, and C (508, 510, and 512) are synchronous MAC enabled nodes. In the depicted operational aspect, node A 508 selects a first of the type I slots 504 within which to communicate information 516, node B 510 selects a second of the type I slots 504 within which to communication information 519, and node C 512 selects a third of the type I slots 504 within which to communication information 520. Thereafter, Node B 510 determines a previous reception was successful. As depicted in FIG. 5, node B 510 does not successfully decode 518 the information from Node A 508, and as such Node B 510 determines that the selected type I slot is not available for transmission and instead attempts to transmit the information 519 during the time interval allocated for type II slots 506. By contrast, Node C 512 detects the previously successful transmission (e.g., the information 516 transmitted by Node A 508) during the type I slot preceding the type I slot selected by Node C 512, and as such, Node C 512 transmits information 520 during the type I slot selected by Node C 512. During a subsequent transmission interval, node B 510 may return to use of type I slots 504 upon successful receipt of information (e.g. 516).

With the slot structure depicted in FIGS. 3, 4, and 5, legacy nodes may transmit within a significant fraction (e.g., type II slots 306) of a resource 302 while the geometric separation can be maintained and exploited within type I slots 304 for synchronous MAC enabled nodes.

Figure 6:
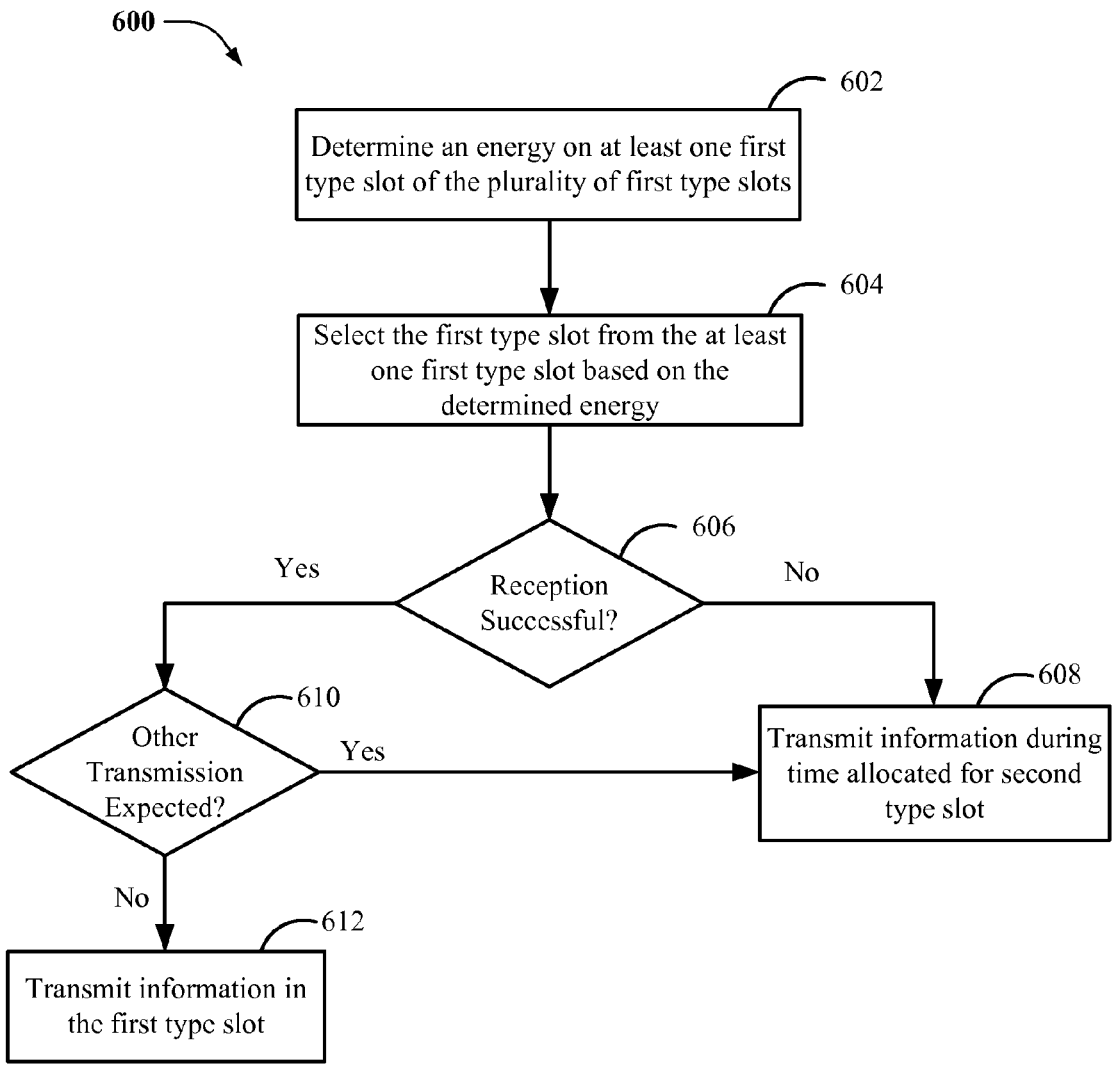
FIG. 6 is a method of wireless communication.

FIG. 6 is a diagram 600 for illustrating an exemplary method. At block 602, a node determines energy levels for a first type of slot. As discussed above, the first type of slot may include an interval length approximately equal to a data transmission duration plus a DIFS. At block 604, the node selects one of the first type of slots for communications. In one aspect, selection of the first type of slot may be made by identifying the first type of slot that is least in conflict with other first type slots. Such a first type of slot may be identified by an amount of energy observed in the slot. This process of slot selection assures that nodes that transmit together are spatially spread apart in a uniform manner. Further, the process has the property of evenly spreading out the nodes across the whole duration.

At block 606, the node determines whether a previous communication was successful. In one aspect, the previous communication may occur at a slot that precedes the first type of slot selected by the node. In one aspect, the node determines whether the communication is successful by successfully decoding the information transmitted/broadcast during the preceding slot. If at block 606, the node determines that a preceding communication was unsuccessful, then at block 608, the node may attempt to transmit the information during a second type of slot. As discussed above, the second type of slot may include an interval length approximately equal to a data transmission duration plus a EIFS plus a guard duration.

By contrast, if at block 606 the node determines that a preceding communication was successful, then at block 610, the node determines whether other transmission is expected to occur during a gap preceding the selected first type slot and/or during the selected first type slot. In one aspect, such a transmission may be expected when a legacy node has entered the system and blindly determined that the channel was available. If at block 610, the node determines that no other transmissions are expected to occur during a gap preceding the first type slot and during the first type slot, then at block 612 the node transmits information using the selected first slot type. In one aspect, the node times the transmission to begin at a slot boundary. By contrast, if at block 610 the node determines that another transmission is expected to occur during a gap preceding the first type slot and during the first type slot, then at block 608, the node may attempt to transmit the information during a second type of slot.

As such, a node may communicate using the first type of slot when a previous reception was successful, and otherwise the node communicates using the second type of slot.

Figure 7:
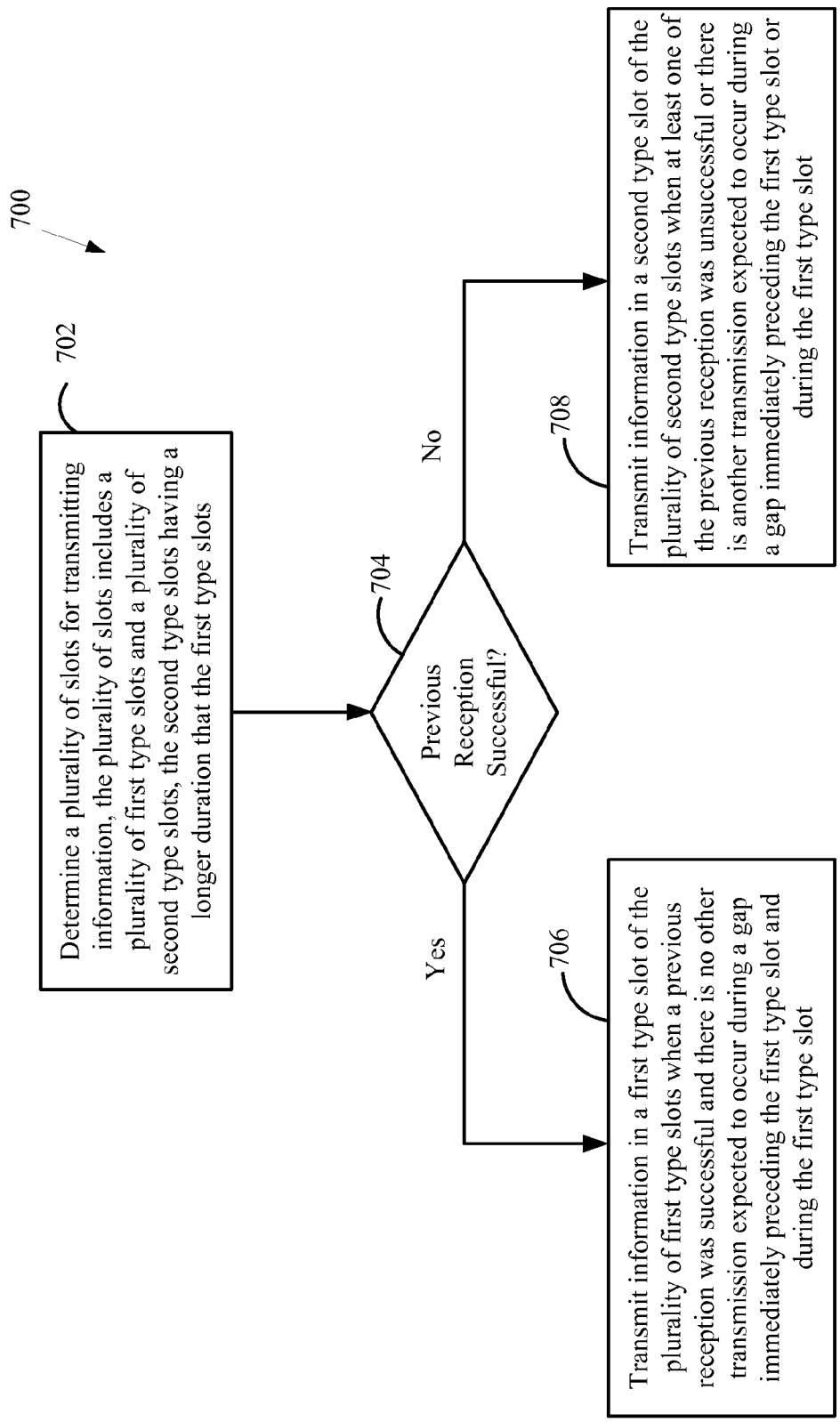
FIG. 7 is a flow chart of a method of wireless communication.

FIG. 7 is a flow chart 700 of an exemplary method. The method is performed by a wireless device. In one aspect, the wireless device may be a synchronous MAC enabled node in an 802.11 CSMA based network. As shown in FIG. 7, the wireless device may determine a plurality of slots for transmitting information including a plurality of first type slots and a plurality of second type slots (702). In such an aspect, the second type slots may have a longer duration that the first type slots. In an aspect, synchronous resources within the plurality of slots may be overlaid with resources for use by asynchronous MAC enabled nodes to communicate in a CSMA network. In an aspect, each first type slot of the plurality of first type slots may have a fixed duration that includes a first space during which no information is transmitted, and each second type slot of the plurality of second type slots may have a fixed duration that includes a second space during which no information is transmitted. Similar to above, in an aspect, the second space may be larger than the first space. In such an aspect, the first and second spaces may each include a DIFS during which no information may be transmitted. In one aspect, the plurality of first type slots may be more likely to be available for synchronous MAC enabled nodes to communicate in the CSMA network than asynchronous MAC enabled node. In one aspect, the plurality of first type slots is consecutive in time within the plurality of slots.

The wireless device may determine whether a previous reception was successful and/or whether another transmission is expected to occur during a gap preceding the first type slot or during the first type slot (704). If a previous reception was successful and there is no other transmission expected to occur during a gap preceding the first type slot and during the first type slot, then the wireless device transmits information in a first type slot of the plurality of first type slots (706). In one aspect, the gap is a DIFS. In such an aspect, the information may be transmitted at a boundary of a previous slot. Further, the information may be delivered as a packet to a MAC layer for transmission at the boundary of a previous slot. If the previous reception was unsuccessful and/or there is another transmission expected to occur during a gap preceding the first type slot or during the first type slot, then the wireless device transmits information in a second type slot of the plurality of second type slots (708).

Figure 8:
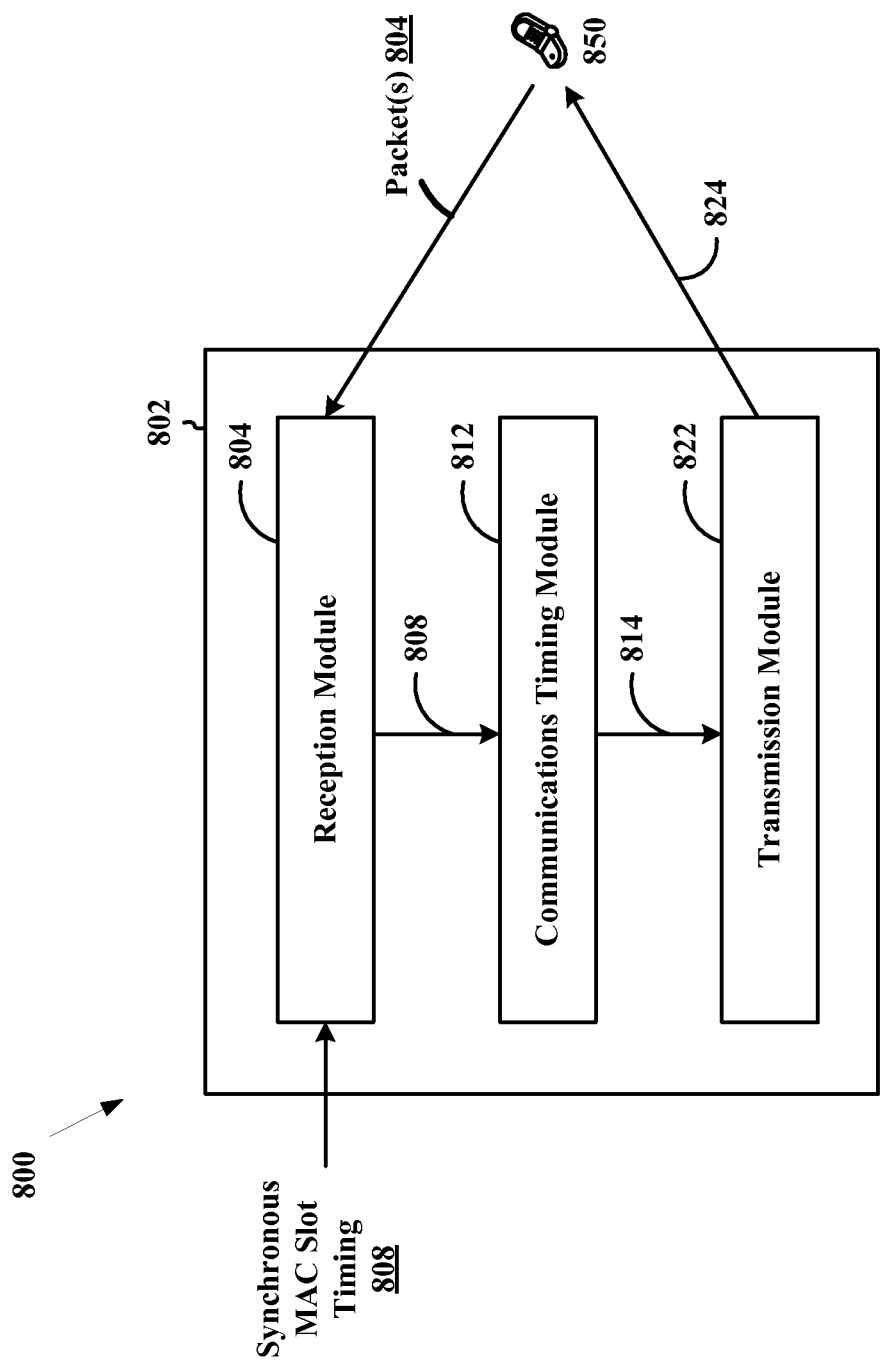
FIG. 8 is a conceptual data flow diagram illustrating the data flow between different modules/means/components in an exemplary apparatus.

FIG. 8 is a conceptual block diagram 800 illustrating the functionality of an exemplary apparatus 802. The apparatus 802 includes a reception module 804 that receives one or more packets 806 from other devices 850 in a peer-to-peer system. In one aspect, reception module 804 may receive synchronous MAC slot timing information 808 to facilitate communications in a synchronous MAC system. In an aspect, transmission module 822 may transmit information within a structure that includes a plurality of slots with a plurality of first type slots and a plurality of second type slots. Further, the second type slots may have a longer duration that the first type slots. Apparatus 802 includes communications timing module 812 that may determine when to communicate based at least in part on the synchronous MAC slot timing information 808. Communications timing module 812 determines whether to transmit using timing information 814 based on a first type slot or a second type slot. In one aspect, communications timing module 812 determines that a first type slot is to be used when a previous reception was successful, and/or a second type slot is to be used when a previous reception was unsuccessful. The apparatus 802 includes transmission module 822 that may use timing information 814 to transmit information 824 in a first type slot of the plurality of first type slots when a previous reception was successful and/or transmits information in a second type slot of the plurality of second type slots when the previous reception was unsuccessful.

The apparatus may include additional modules that perform each of the steps of the algorithm in the aforementioned flow charts of FIGS. 5 and 6. As such, each step in the aforementioned flow charts of FIGS. 5 and 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
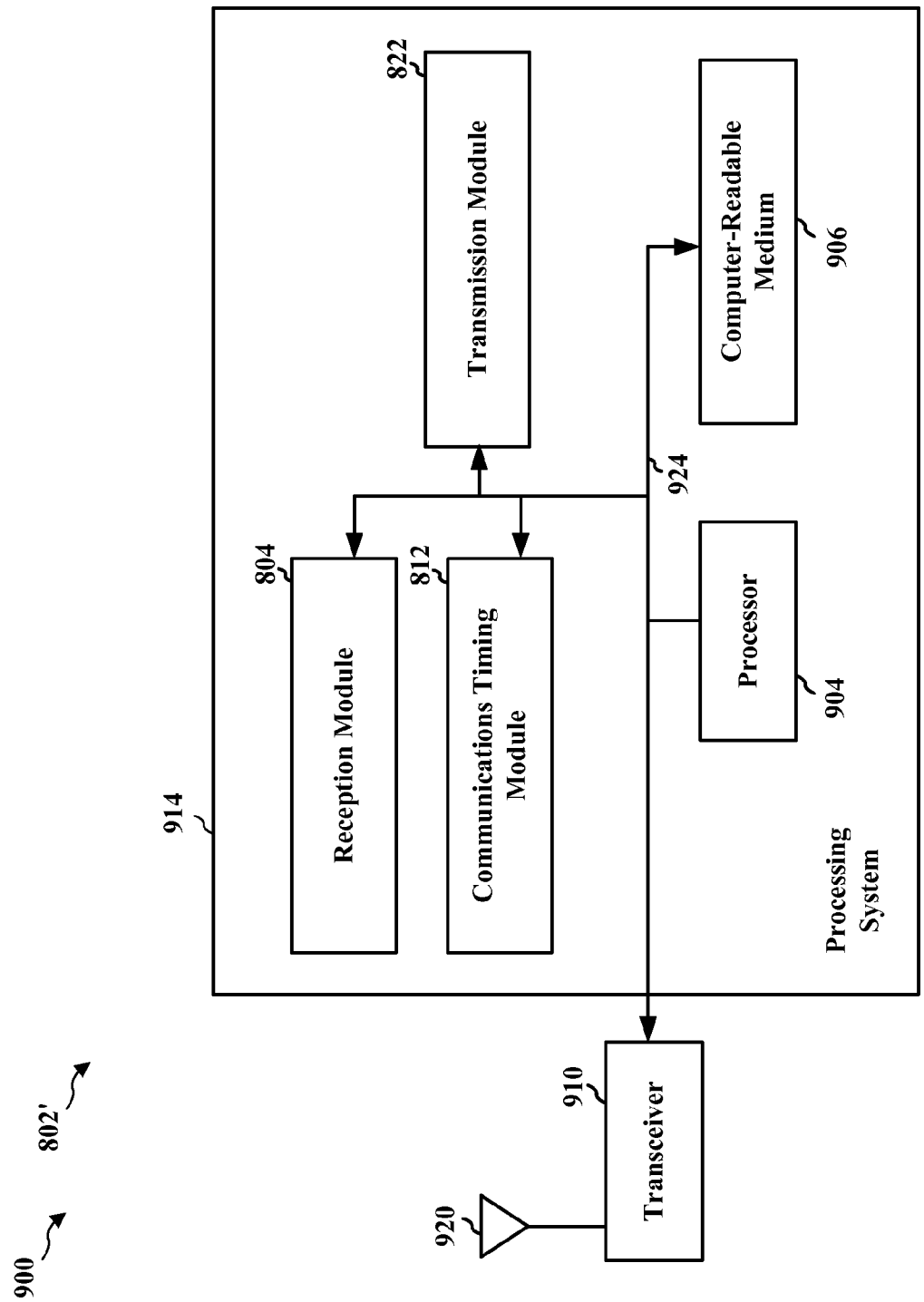
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 1204, 1206, 1208, and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 804, 812, and 822. The modules may be software modules running in the processor 904, resident/stored in the computer readable medium 906, one or more hardware modules coupled to the processor 904, or some combination thereof. The processing system 914 may be a component of the UE 110 and may include the memory and/or at least one processor.

In one configuration, the apparatus 802/802' for wireless communication includes means for means for determining a plurality of slots for transmitting information, the plurality of slots comprising a plurality of first type slots and a plurality of second type slots, the second type slots having a longer duration that the first type slots, and means for transmitting information in a first type slot of the plurality of first type slots when a previous reception was successful and there is no other transmission expected to occur during a gap preceding the first type slot and during the first type slot, or means for transmitting information in a second type slot of the plurality of second type slots when at least one of the previous reception was unsuccessful or there is another transmission expected to occur during a gap preceding the first type slot or during the first type slot. The apparatus 802/802' further includes means for determining an energy on at least one first type slot of the plurality of first type slots, and means for selecting the first type slot from the at least one first type slot based on the determined energy. The apparatus 802/802' further includes means for determining an energy on at least one second type slot of the plurality of second type slots, and means for selecting the second type slot from the at least one second type slot based on the determined energy. The aforementioned means may be one or more of the aforementioned modules of the apparatus 802 and/or the processing system 914 of the apparatus 802' configured to perform the functions recited by the aforementioned means. As described supra, the processing system 914 may include a TX Processor, a RX Processor, and a controller/processor. As such, in one configuration, the aforementioned means may be the TX Processor, the RX Processor, and/or the controller/processor configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of wireless communication, comprising:
   determining a plurality of slots for transmitting information, the plurality of slots comprising a plurality of first type slots for data transmission and a plurality of second type slots for data transmission, the second type slots having a longer duration than the first type slots; and
   transmitting information in a first type slot of the plurality of first type slots when a previous reception was successful and there is no other transmission expected to occur during a gap preceding the first type slot and during the first type slot; or
   transmitting information in a second type slot of the plurality of second type slots when at least one of the previous reception was unsuccessful or there is another transmission expected to occur during a gap preceding the first type slot or during the first type slot.

2. The method of claim 1, wherein the gap is a distributed coordination function (DCF) interframe space (DIFS).

3. The method of claim 1, wherein synchronous resources within the plurality of slots are overlaid with resources for use by asynchronous medium access control (MAC) enabled nodes to communicate in a carrier sense multiple access (CSMA) network.

4. The method of claim 1, wherein each first type slot of the plurality of first type slots has a fixed duration that includes a first space during which no information is transmitted, each second type slot of the plurality of second type slots has a fixed duration that includes a second space during which no information is transmitted, the second space being larger than the first space.

5. The method of claim 4, wherein the first space includes a DIFS during which no information is transmitted and the second space includes an extended interframe space (EIFS) during which no information is transmitted.

6. The method of claim 1, further comprising:
   determining an energy on at least one first type slot of the plurality of first type slots; and
   selecting the first type slot from the at least one first type slot based on the determined energy.

7. The method of claim 1, further comprising:
   determining an energy on at least one second type slot of the plurality of second type slots; and
   selecting the second type slot from the at least one second type slot based on the determined energy.

8. The method of claim 1, wherein the information is transmitted at a boundary of a previous slot.

9. The method of claim 1, wherein the information is delivered as a packet to a MAC layer for transmission at a boundary of a previous slot.

10. The method of claim 1, wherein the plurality of first type slots are consecutive in time within the plurality of slots.

11. The method of claim 1, wherein the method is performed by a synchronous MAC enabled node in an 802.11 CSMA based network.

12. The method of claim 11, wherein the plurality of first type slots are more likely to be available for synchronous MAC enabled nodes to communicate in the CSMA network than asynchronous MAC enabled nodes to communicate in the CSMA network.

13. An apparatus of wireless communication, comprising:
   means for determining a plurality of slots for transmitting information, the plurality of slots comprising a plurality of first type slots for data transmission and a plurality of second type slots for data transmission, the second type slots having a longer duration than the first type slots; and
   means for transmitting information in a first type slot of the plurality of first type slots when a previous reception was successful and there is no other transmission expected to occur during a gap preceding the first type slot and during the first type slot; or
   means for transmitting information in a second type slot of the plurality of second type slots when at least one of the previous reception was unsuccessful or there is another transmission expected to occur during a gap preceding the first type slot or during the first type slot.

14. The apparatus of claim 13, wherein the gap is a DIFS.

15. The apparatus of claim 13, wherein synchronous resources within the plurality of slots are overlaid with resources for use by asynchronous MAC enabled nodes to communicate in a CSMA network.

16. The apparatus of claim 13, wherein each first type slot of the plurality of first type slots has a fixed duration that includes a first space during which no information is transmitted, each second type slot of the plurality of second type slots has a fixed duration that includes a second space during which no information is transmitted, the second space being larger than the first space.

17. The apparatus of claim 16, wherein the first space includes a DIFS during which no information is transmitted and the second space includes an EIFS during which no information is transmitted.

18. The apparatus of claim 13, further comprising:
   means for determining an energy on at least one first type slot of the plurality of first type slots; and
   means for selecting the first type slot from the at least one first type slot based on the determined energy.

19. The apparatus of claim 13, further comprising:
   means for determining an energy on at least one second type slot of the plurality of second type slots; and
   means for selecting the second type slot from the at least one second type slot based on the determined energy.

20. The apparatus of claim 13, wherein the information is transmitted at a boundary of a previous slot.

21. The apparatus of claim 13, wherein the information is delivered as a packet to a MAC layer for transmission at a boundary of a previous slot.

22. The apparatus of claim 13, wherein the plurality of first type slots are consecutive in time within the plurality of slots.

23. The apparatus of claim 13, wherein the apparatus is a synchronous MAC enabled node in an 802.11 CSMA based network.

24. The apparatus of claim 23, wherein the plurality of first type slots are more likely to be available for synchronous MAC enabled nodes to communicate in the CSMA network than asynchronous MAC enabled nodes to communicate in the CSMA network.

25. A computer program product in a wireless device, comprising:
   a non-transitory computer-readable medium comprising code for:
   determining a plurality of slots for transmitting information, the plurality of slots comprising a plurality of first type slots for data transmission and a plurality of second type slots for data transmission, the second type slots having a longer duration than the first type slots; and
   transmitting information in a first type slot of the plurality of first type slots when a previous reception was successful and there is no other transmission expected to occur during a gap preceding the first type slot and during the first type slot; or
   transmitting information in a second type slot of the plurality of second type slots when at least one of the previous reception was unsuccessful or there is another transmission expected to occur during a gap preceding the first type slot or during the first type slot.

26. The computer program product of claim 25, wherein the gap is a DIFS.

27. The computer program product of claim 25, wherein synchronous resources within the plurality of slots are overlaid with resources for use by asynchronous MAC enabled nodes to communicate in a CSMA network.

28. The computer program product of claim 25, wherein each first type slot of the plurality of first type slots has a fixed duration that includes a first space during which no information is transmitted, each second type slot of the plurality of second type slots has a fixed duration that includes a second space during which no information is transmitted, the second space being larger than the first space.

29. The computer program product of claim 28, wherein the first space includes a DIFS during which no information is transmitted and the second space includes an EIFS during which no information is transmitted.

30. The computer program product of claim 25, further comprising code for:
  determining an energy on at least one first type slot of the plurality of first type slots; and
  selecting the first type slot from the at least one first type slot based on the determined energy.

31. The computer program product of claim 25, further comprising code for:
  determining an energy on at least one second type slot of the plurality of second type slots; and
  selecting the second type slot from the at least one second type slot based on the determined energy.

32. The computer program product of claim 25, wherein the information is transmitted at a boundary of a previous slot.

33. The computer program product of claim 25, wherein the information is delivered as a packet to a MAC layer for transmission at a boundary of a previous slot.

34. The computer program product of claim 25, wherein the plurality of first type slots are consecutive in time within the plurality of slots.

35. The computer program product of claim 25, wherein the code is performed on a synchronous MAC enabled node in an 802.11 CSMA based network.

36. The computer program product of claim 35, wherein the plurality of first type slots are more likely to be available for synchronous MAC enabled nodes to communicate in the CSMA network than asynchronous MAC enabled nodes to communicate in the CSMA network.

37. An apparatus for wireless communication, comprising:
  a processing system configured to:
  determine a plurality of slots for transmitting information, the plurality of slots comprising a plurality of first type slots for data transmission and a plurality of second type slots for data transmission, the second type slots having a longer duration than the first type slots; and
  transmit information in a first type slot of the plurality of first type slots when a previous reception was successful and there is no other transmission expected to occur during a gap preceding the first type slot and during the first type slot; or
  transmit information in a second type slot of the plurality of second type slots when at least one of the previous reception was unsuccessful or there is another transmission expected to occur during a gap preceding the first type slot or during the first type slot.

38. The apparatus of claim 37, wherein the gap is a DIFS.

39. The apparatus of claim 37, wherein synchronous resources within the plurality of slots are overlaid with resources for use by asynchronous MAC enabled nodes to communicate in a CSMA network.

40. The apparatus of claim 37, wherein each first type slot of the plurality of first type slots has a fixed duration that includes a first space during which no information is transmitted, each second type slot of the plurality of second type slots has a fixed duration that includes a second space during which no information is transmitted, the second space being larger than the first space.

41. The apparatus of claim 40, wherein the first space includes a DIFS during which no information is transmitted and the second space includes an EIFS during which no information is transmitted.

42. The apparatus of claim 37, wherein the processing system is further configured to:
  determine an energy on at least one first type slot of the plurality of first type slots; and
  select the first type slot from the at least one first type slot based on the determined energy.

43. The apparatus of claim 37, wherein the processing system is further configured to:
  determine an energy on at least one second type slot of the plurality of second type slots; and
  select the second type slot from the at least one second type slot based on the determined energy.

44. The apparatus of claim 37, wherein the information is transmitted at a boundary of a previous slot.

45. The apparatus of claim 37, wherein the information is delivered as a packet to a MAC layer for transmission at a boundary of a previous slot.

46. The apparatus of claim 37, wherein the plurality of first type slots are consecutive in time within the plurality of slots.

47. The apparatus of claim 37, wherein the apparatus is a synchronous MAC enabled node in an 802.11 CSMA based network.

48. The apparatus of claim 47, wherein the plurality of first type slots are more likely to be available for synchronous MAC enabled nodes to communicate in the CSMA network than asynchronous MAC enabled nodes to communicate in the CSMA network.

* * * * *